United States Patent
Dahlén

(10) Patent No.: US 9,462,516 B2
(45) Date of Patent: *Oct. 4, 2016

(54) METHOD AND APPARATUS FOR FREQUENCY ACCESS RESTRICTION IN CELLULAR COMMUNICATIONS

(71) Applicant: TELEFONAKTIEBOLAGET L M ERICSSON (PUBL), Stockholm (SE)

(72) Inventor: Anders Dahlén, Västerhaninge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/944,644

(22) Filed: Nov. 18, 2015

(65) Prior Publication Data

US 2016/0073304 A1   Mar. 10, 2016

Related U.S. Application Data

(63) Continuation of application No. 14/561,658, filed on Dec. 5, 2014, which is a continuation of application No. 12/863,145, filed as application No. PCT/SE2008/050091 on Jan. 25, 2008, now Pat. No. 8,948,758.

(51) Int. Cl.
*H04W 36/00* (2009.01)
*H04W 48/02* (2009.01)
(Continued)

(52) U.S. Cl.
CPC ..... *H04W 36/0072* (2013.01); *H04W 36/0061* (2013.01); *H04W 36/0083* (2013.01);
(Continued)

(58) Field of Classification Search
CPC ......... H04W 72/005; H04W 36/0083; H04W 36/30; H04W 36/24; H04W 36/00; H04W 28/18; H04W 36/0055; H04W 36/0061; H04W 48/18; H04W 4/06
See application file for complete search history.

(56) References Cited

U.S. PATENT DOCUMENTS 7,477,920 B2   1/2009   Scheinert
7,894,816 B1   2/2011   Chalishazar et al.
(Continued)

FOREIGN PATENT DOCUMENTS

CN   2601063 C   8/2005
EP   1286561 A1   2/2003
(Continued)

OTHER PUBLICATIONS

English summary of Japanese official action mailed Jun. 19, 2012, in Japanese Application No. JP2010-544261.
(Continued)

*Primary Examiner* — Nizar Sivji

(57) ABSTRACT

A Network node provides information to a base station indicating a list of forbidden frequency from which the base station may or may not offer services. The base station checks the received list of forbidden frequencies when considering whether to provide service to user equipments from a new tracking area or a certain access technology. The base may also transmit a list of allowed frequencies or the list of forbidden frequencies to user equipments to be used thereof. By introducing the possibility to set an amount of frequencies as forbidden in the area and access restriction information of user equipments, operators would be able to offer services like home base station in a simple way to customers.

9 Claims, 9 Drawing Sheets

(51) Int. Cl.
  *H04W 48/08* (2009.01)
  *H04W 36/30* (2009.01)
  *H04J 11/00* (2006.01)
  *H04W 36/38* (2009.01)

(52) U.S. Cl.
  CPC ............ *H04W36/30* (2013.01); *H04W 48/02* (2013.01); *H04W 48/08* (2013.01); *H04J 11/0069* (2013.01); *H04W 36/38* (2013.01)

(56) References Cited

U.S. PATENT DOCUMENTS

| | | | |
|---|---|---|---|
| 2004/0152482 | A1 | 8/2004 | Raffel et al. |
| 2004/0203805 | A1 | 10/2004 | Khawand |
| 2005/0043046 | A1 | 2/2005 | Lee |
| 2005/0148368 | A1 | 7/2005 | Scheinert et al. |
| 2005/0271012 | A1 | 12/2005 | Agrawal et al. |
| 2006/0121935 | A1 | 6/2006 | Dalsgaard et al. |
| 2006/0194582 | A1 | 8/2006 | Cooper |
| 2007/0037577 | A1* | 2/2007 | Dalsgaard ............ H04W 48/18 455/436 |
| 2007/0207815 | A1 | 9/2007 | Alfano et al. |
| 2007/0287419 | A1 | 12/2007 | Wang |
| 2008/0188215 | A1* | 8/2008 | Bergstrom ............ H04W 48/20 455/424 |
| 2009/0170528 | A1 | 7/2009 | Bull et al. |
| 2009/0233601 | A1* | 9/2009 | Vikberg ................ H04W 36/14 455/436 |
| 2009/0274119 | A1* | 11/2009 | Gupta ............... H04W 36/0061 370/331 |

FOREIGN PATENT DOCUMENTS

| | | | |
|---|---|---|---|
| EP | 1739991 | | 1/2007 |
| FR | WO 2007148911 | A1 * | 12/2007 .......... H04J 11/0093 |
| JP | 09-149452 | | 6/1997 |
| JP | 2001-008251 | A | 1/2001 |
| JP | 2001-008251 | A1 | 1/2001 |
| JP | 2003-508988 | | 3/2003 |
| JP | 2007-013988 | | 1/2007 |
| WO | 01/17293 | | 3/2001 |
| WO | 2007/020515 | A1 | 2/2007 |
| WO | 2007/148911 | A1 | 12/2007 |

OTHER PUBLICATIONS

3GPP TSG RAN WG2#58bis, Measurement Control in LTE_Active State (for CSG Cells), Orlando, US, Jun. 25-29, 2007, R2-072829.
3GPP TSG RAN WG2 #58bis, Neighbor Cell List Reduction, Sorrento, Italy, Jan. 15-19, 2007, TDoc R2-070147.
3GPP TSG-RAN#57-bis, Relevant Information for Handover, Malta, Mar. 26-30, 2007, R2-071364.
3GPP TSG RAN WG2#58bis, Triggering of Measurements in LTE_ACTIVE for CSG Cells, Orlando, US, Jun. 25-29, 2007, R2-072826.
English summary of Japanese official action mailed Feb. 14, 2012, in Japanese App. No. JP2010-544261.
3GPP TSG RAN WG3 Meeting #58, R3-072320, "Area restriction information," Jeju Island, Korea, Nov. 5-9, 2007, 53 pages.
3GPP TSG RAN WG3 Meeting #58, R3-072396, "Area restriction information," Jeju Island, Korea, Nov. 5-9, 2007, 28 pages.
European Office Action dated Sep. 15, 2014, in EP087053633, 5 pages.
English translation of Chinese Office Action, Oct. 31, 2012, in Chinese App. No. 200880125905.4.
International Search Report, PCT/SE2008/050091, mailed Nov. 25, 2008.
3GPP TSG RAN WG3 Meeting #58 R3-072217, "Handling of Area and Access Restrictions in LTE/SAE for UEs in LTE-Active," Nov. 5-9, 2007.
English translation of Grounds for Rejection in corresponding Japanese application No. JPA2010-544261, dated Oct. 12, 2011 (2 pages).
Supplementary European Search Report in corresponding European application No. 08705363, dated Jan. 12, 2012 (6 pages).
3GPP TSG-RAN WG3 Meeting #59bis; R3-080621; 3rd Generation Partnership Project, Mobile Competence Centre, "More access restriction information," Shenzhen, China, Mar. 31-Apr. 3, 2008.
3GPP TR 25.922 v7.1.0 (Mar. 2007) 3rd Generation Partnership Project; Technical Specification Group Radio Access Network; Radio resource management strategies (Release 7).
3GPP TS 25304 v7.3.0 (Sep. 2007), 3rd Generation Partnership Project; Technical Specification Group Radio Access Network; User Equipment procedure in idle mode and procedures for cell reselection in connected mode (Release 7).

\* cited by examiner

METHOD AND APPARATUS FOR FREQUENCY ACCESS RESTRICTION IN CELLULAR COMMUNICATIONS

CROSS-REFERENCE TO RELATED APPLICATIONS

This application is a continuation of U.S. patent application Ser. No. 14/561,658, filed on Dec. 5, 2014, which is a continuation of U.S. patent application Ser. No. 12/863,145, filed on Jul. 15, 2010, now U.S. Pat. No. 8,948,758, which corresponds to the national-stage entry of International Application PCT/SE2008/050091, with an international filing date of Jan. 25, 2008. The contents of all of the preceding are hereby incorporated by reference.

TECHNICAL FIELD

The present invention relates in general to radio communications and in particular to a method and a device for restricting frequency access in cellular communication systems.

BACKGROUND

In a typical cellular radio system, mobile terminals (also known as mobile stations and mobile user equipment units (UEs)) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station, e.g., a radio base station (RBS), which in some networks is also called "NodeB" or "B node". A cell is a geographical area where radio coverage is provided by the radio base station equipment at a base station site. Each cell is identified by a unique identity within the local radio area, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network providing wideband code division multiple access for user equipment units (UEs). The Third Generation Partnership Project (3GPP or "3G") has undertaken to evolve further the predecessor technologies, e.g., GSM-based and/or second generation ("2G") radio access network technologies.

Long Term Evolution (LTE) is a variant of a 3GPP radio access technology wherein the radio base station nodes are connected directly to a core network rather than to radio network controller (RNC) nodes. In LTE, in general, functions of a radio network controller (RNC) node are performed by the radio base stations nodes. As such, the radio access network (RAN) of an LTE system has an essentially "flat" architecture comprising radio base station nodes without reporting to radio network controller (RNC) nodes.

FIG. 1 illustrates a LTE system 10 sometimes referred to evolved-UTRAN (e-UTRAN). The LTE system includes Base Stations (BS) 13, 14 which communicate together over an X2 interface. The base stations 13, 14 are sometimes referred to as e-UTRAN node Bs (eNBs) in the 3GPP. The base stations 13, 14 communicate over an S1 interface with an evolved packet core (EPC) which includes one or more nodes labeled as mobility management entity (MME)/Serving Gateway (S-GW) 11. The MME handles the control plane (CP) in the EPC and S-GW handles the user plane (UP).

The base stations 13, 14 communicate over the radio/air interface with user equipments (UE) 12, a plurality of cells or sectors includes base stations that are geographically distributed in a known manner. The portion of the example system that is illustrated in FIG. 1 includes two cells A and B.

Mobility features of a mobile radio communications system can be divided into two areas: radio mobility, which mainly consists of handover involving UEs in active state which is also called RRC_CONNECTED state or EMM-CONNECTED state, and network mobility, which mainly consists of location management including location updates and paging involving UEs in idle state, which is also called RRC_IDLE state or EMM-IDLE state or just idle mode.

FIG. 2 illustrates two tracking areas TA1 and TA2. TA1 encompasses cells C1-C7 and tracking area TA2 encompasses representatives cells C8-C14. TA1 and TA2 cover a geographic area and might be owned or operated by the same operator or by two different operators, i.e. operator A operates TA1 and operator B operates TA2. Moving form one cell to another, network controlled handover is performed for UEs in active state and cell reselection is performed by UEs in idle state. The term "tracking area" used in LTE is equivalent to the term "location area" used in UTRAN.

In LTE active state, the UE position is known by the network at cell level or at least eNB level. When the UE transfers from idle to active state, area and access restriction information is sent from MME to the serving eNB 12 and it can be updated during active state. The area and access restriction information is valid for the concerned UE only, and hence each UE can have its unique area and access restriction information. The area and access restriction information is stored at the eNB in the UE context of the concerned UE and it is propagated from source eNB 13 to target eNB 14 at X2 handover or intra-MME/S-GW handover. At inter-MME/S-GW handover or at inter-RAT handover one or two MMEs are involved in the handover process and the EPC can then transfer new area and access restriction information to the target eNB. The area and access restriction information may include serving PLMN (Public Land Mobile Network) and Equivalent PLMNs as a list of allowed PLMNs, forbidden tracking areas and location areas, and forbidden inter-RATs (radio Access technology). This information is used in the eNB of cell A to determine whether a neighboring cell B is allowed for handover for the concerned UE.

In LTE idle state, the UE positions are known by the network at TA (tracking area) level. When camped on a cell, the UE searches regularly for a better cell according to the cell reselection criteria, which involves measurements of the serving and neighboring cells. The cell reselection criteria includes that the target cell has to be a suitable cell, which means that the PLMN, the tracking area and the location area may not be stored in the UE as forbidden PLMN, forbidden tracking area or forbidden location area, respectively. The cell reselection mechanism requires that each cell periodically broadcast the PLMN identity and the identity of its tracking area (or location area if UTRAN or GERAN cell). Each UE listens to the broadcast information on a cell's broadcast channel and stores the current PLMN identity and tracking area identity. If the received tracking area identity differs from the one stored by the UE, a tracking area update procedure is triggered by the UE. The MME can reject a tracking area update for many causes; one example is so called forbidden tracking area which indicates that the received tracking area is forbidden for the UE to camp on. When the UE receives this rejection cause, it stores the broadcasted tracking area identity as forbidden tracking area, and the UE start to search for another cell. Similarly the MME can reject a tracking area update with cause forbidden PLMN at which the UE stores the broadcasted PLMN identity as forbidden, and the UE start to search for a network with another PLMN identity.

In conclusion, it is possible to perform mobility restriction of a UE in both active state and idle state on PLMN identity, tracking area and location area. At active state in LTE it is also possible to perform handover restriction on one or several radio access technologies, by setting forbidden inter-RAT. For a UE with the forbidden inter-RAT set to UTRAN, the handover is forbidden to all UTRAN neighbor cells, independently of what PLMN identities or location areas the UTRAN cells belong to. It is another way to say that all location areas in UTRAN are forbidden or another way to say that the PLMN identity of the UTRAN is not allowed.

The forbidden inter-RAT is more than this, since it does not require that location areas are different in UTRAN and GSM EDGE Radio Access Network (GERAN) or that PLMN identity of the UTRAN is not used in any other radio access technology to enable that only UTRAN is forbidden. However, since no forbidden inter-RAT concept exists for UEs in idle state, the location areas or PLMN has to be different in different RATs to enable the same area and access restriction for a UE in idle state as in active state.

A problem with the forbidden inter-RAT is that the operator might not want to block all carrier frequencies on an Inter-RAT. For example, when two operators, operator A and operator B, share the same LTE network and operator A have signed a roaming agreement to allow subscribers of operator B to roam in for example GSM 900 only, but there are GSM 1800 cells in the GERAN network of operator A as well that operator A wants to block. Another example could be that a service level agreement is signed with a virtual operator to allow access of the virtual operators subscribers in LTE and UMTS 2100 but not in UMTS 900, which is also available in the same PLMN and which can not be blocked by forbidden inter-RAT in the area and access restriction information. Moreover, the UMTS network could consist of hierarchical cell structures, and the subscriber of the virtual operator could be allowed access only to the macro cells in that UMTS network.

Another problem with the area and access restriction information is that an operator might want to block a certain LTE carrier frequency and there is no simple way to perform this. For example, some operators offer a special home base station access where all customers that have home base station from that operator are offered access to all other home base station within the operator's network. Customers that do not have any home base station would not be allowed access to any home base stations in the network; instead they would have the frequency of the home base stations as forbidden frequency. This assumes that a special carrier frequency is used for the home base stations only.

Yet another problem with the area and access restriction information is that an operator only wants to perform access restriction on an individual location area of one frequency, i.e. there is a location area 1 using frequency 1 and 2 but only frequency 2 in area 1 should be restricted for some subscribers. This would mean that an operator do not want to restrict frequency 2 everywhere in the network, but only when some subscribers are in area 1 of frequency 1. Hence, the operator would like to change the forbidden frequency list when moving in and out of area 1. The area could be tracking area, location area, service area or maybe some new area concept that does not exist currently in 3GPP standard.

One way to perform area and access restrictions to a carrier frequency or set of frequencies in LTE or in inter-RAT would be to use unique tracking areas (for LTE frequencies) and/or unique location areas (for inter-RAT frequencies) in each frequency to which some users should be blocked. In this case there is no need to send any restriction information for UEs that should be allowed to access all frequencies. The MME sends Serving PLMN and a list of forbidden tracking areas for users that should be blocked from accessing some frequencies. The list of forbidden tracking areas and/or location areas should contain those identities that are used for the carrier frequencies that are not allowed for access. If not all identities of the un-allowed carriers frequencies can be listed then the list should contain the identities used in the surrounding area, primarily. This has the disadvantages that there will be tracking area updates when changing frequency within the RAT for allowed users. It also has the disadvantage that the restriction information will be long and probably needs to be updated during mobility over tracking areas. Since the restriction information list will be long it will also require significant configuration of restriction information in the core network. The MME needs to have neighbor relation information about the tracking and/or location areas, i.e. geographical information of the tracking areas and location areas. If the location areas between UTRAN frequencies or between GERAN frequencies or even between UTRAN and GERAN are configured with same location area identities then a cumbersome reconfiguration of the network would be necessary. Reconfiguring location areas will have a negative effect of serviceability of a network in operation.

SUMMARY

A problem with the wireless communication networks is that blocking certain carrier frequency is difficult and costly. The operator has to reconfigure significantly the restriction information in the core network, which results in worsening the serviceability of a network in operation.

A general object of the present invention is to provide improved methods and arrangements for restricting frequency access in LTE systems.

A further object of the present invention is to provide a method for enabling a base station to restrict frequency access for the UEs.

These and other objects are achieved in accordance with the attached set of claims.

A first embodiment of the present invention provides a method for enabling a base station to restrict frequency access in a wireless communication system having a plurality of base stations, wherein the base station receives from a network node a list of forbidden frequencies related to a mobile station. The base station performs one of selecting allowed target cells for handover based on the received list of forbidden frequencies and transmits to the mobile station allowable frequencies to be used.

Another embodiment of the present invention provides a method for enabling a base station to restrict frequency access in a wireless communication system having a plurality of base stations, wherein the base station receives from a network node a list of forbidden frequencies related to a mobile station. The base station performs one of selecting allowed target cells for handover based on the received list of forbidden frequencies and transmits to the mobile station the received list of forbidden frequencies or a list of allowed frequencies to the mobile station to be used in idle state when performing cell reselection.

Yet another embodiment of the present invention provides a base station for restricting frequency access in a wireless communication system having a plurality of base stations. Said base station comprises a radio transceiver, a network interface adapted to receive from a network node a list of forbidden frequencies related to a mobile station, and a controller unit (81), coupled to said transceiver and interface, and adapted to perform one of selecting allowed target cells for handover based on the received list of forbidden frequencies and providing the mobile station with allowable frequencies to be used.

Yet another embodiment of the present invention provides a base station for restricting frequency access in a wireless communication system having a plurality of base stations. Said base station comprises a radio transceiver, a network interface adapted to receive from a network node a list of forbidden frequencies related to a mobile station, and a controller unit (81), coupled to said transceiver and interface, and adapted to perform one of selecting allowed target cells for handover based on the received list of forbidden frequencies and providing the mobile station with allowable frequencies to be used or with the list of forbidden frequencies to be used for cell reselection and in idle state.

An advantage of the present invention comprises enabling of a base station to block certain frequencies from being used by a mobile station. Since mobile stations that are not allowed into an area would cause a lot of uplink interference using certain frequencies, blocking these frequencies from being used by mobile stations will improve the services provided by the operator.

Another advantage is that introducing restriction of a frequency would be a simple way for an operator to offer a service similar to home base stations access. Customers that are not allowed to access a certain access technology, for example home base station, would not be allowed access to any home base stations with the operator's network assuming that a special frequency is used for the home base stations only.

The invention will now be described more in detail with the aid of preferred embodiments in connection with the enclosed drawings.

BRIEF DESCRIPTION OF DRAWINGS

The present invention will now be described in more detail by way of non-limiting examples and with reference of the accompanying drawings, in which.

DETAILED DESCRIPTION

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. The technology is described in the context of a Long Term Evolution (LTE) of UMTS in order to provide an example and a non-limiting context for explanation. The ideas of the present invention are equally applicable to many types of cellular systems consisting of a plurality of base stations, where restricting frequency access is necessary.

In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs).

Generally, the present invention is applicable to various communications system. Universal Mobile Telecommunications System (UMTS) is one of the third-generation (3G) mobile phone technologies. Currently, the most common form uses W-CDMA as the underlying air interface, is standardized by the 3rd Generation Partnership Project (3GPP), and is the European answer to the ITU IMT-2000 requirements for 3G cellular radio systems. The Long Term Evolution (LTE) of UMTS is under discussion by the 3GPP which standardized UMTS. The objective of the LTE work is to develop a framework for the evolution of the 3GPP radio-access technology towards a high-data-rate, low-latency and packet-optimized radio-access technology. So the focus is on supporting services provided from the packet switched (PS)-domain. LTE is explained as one example of the various communication systems, to which the present invention is applicable, in the following description.

Figure 1:
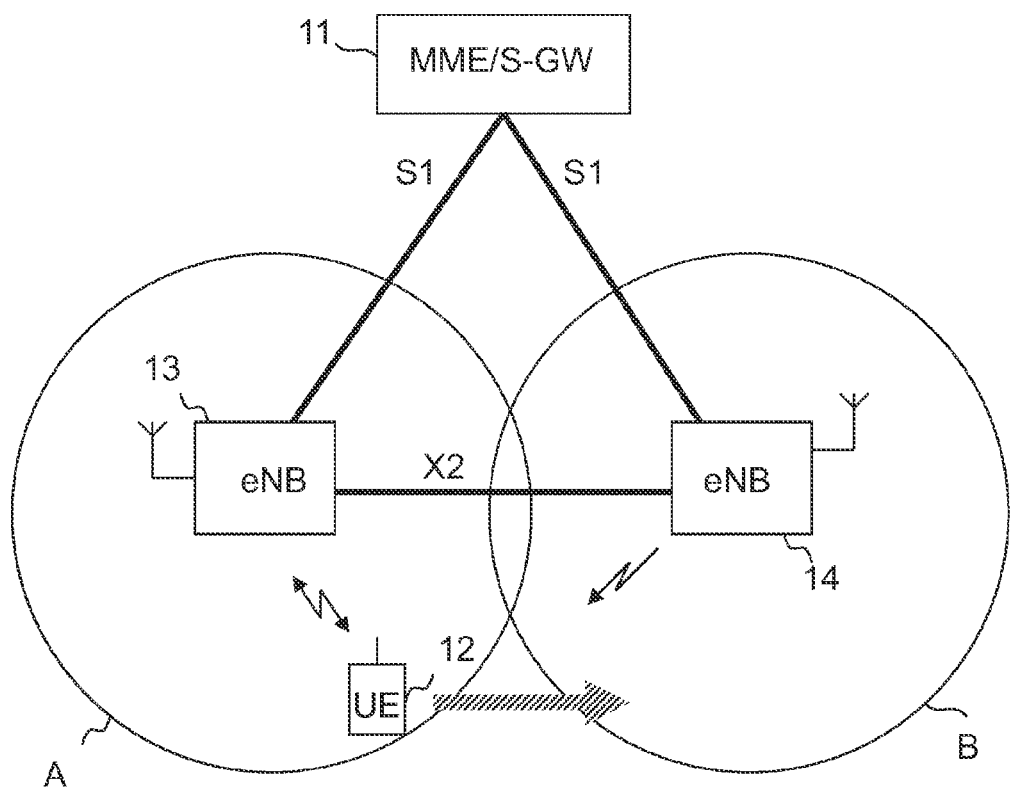
FIG. 1 is a schematic view of a cellular communications network.
Figure 2:
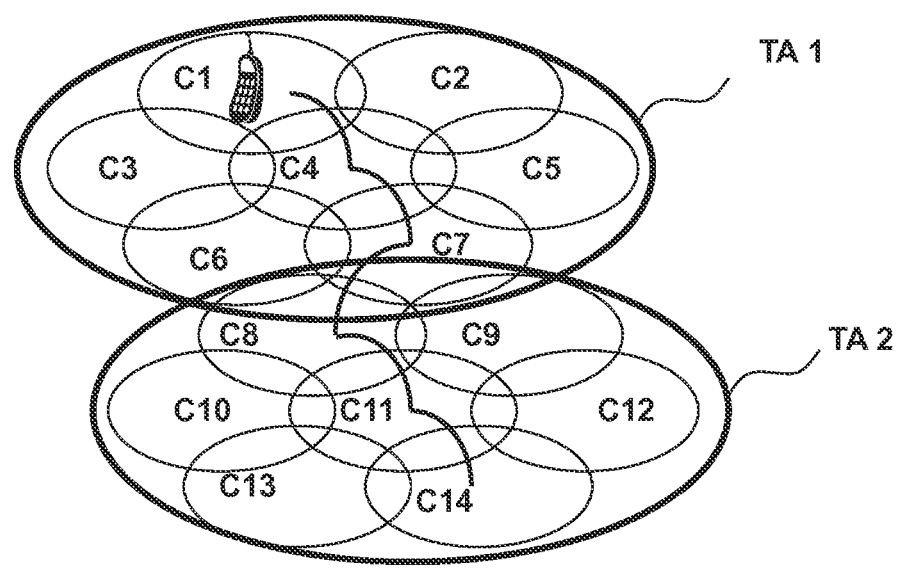
FIG. 2 is an illustration of user equipment moving between cells in two different tracking areas.
Figure 3:
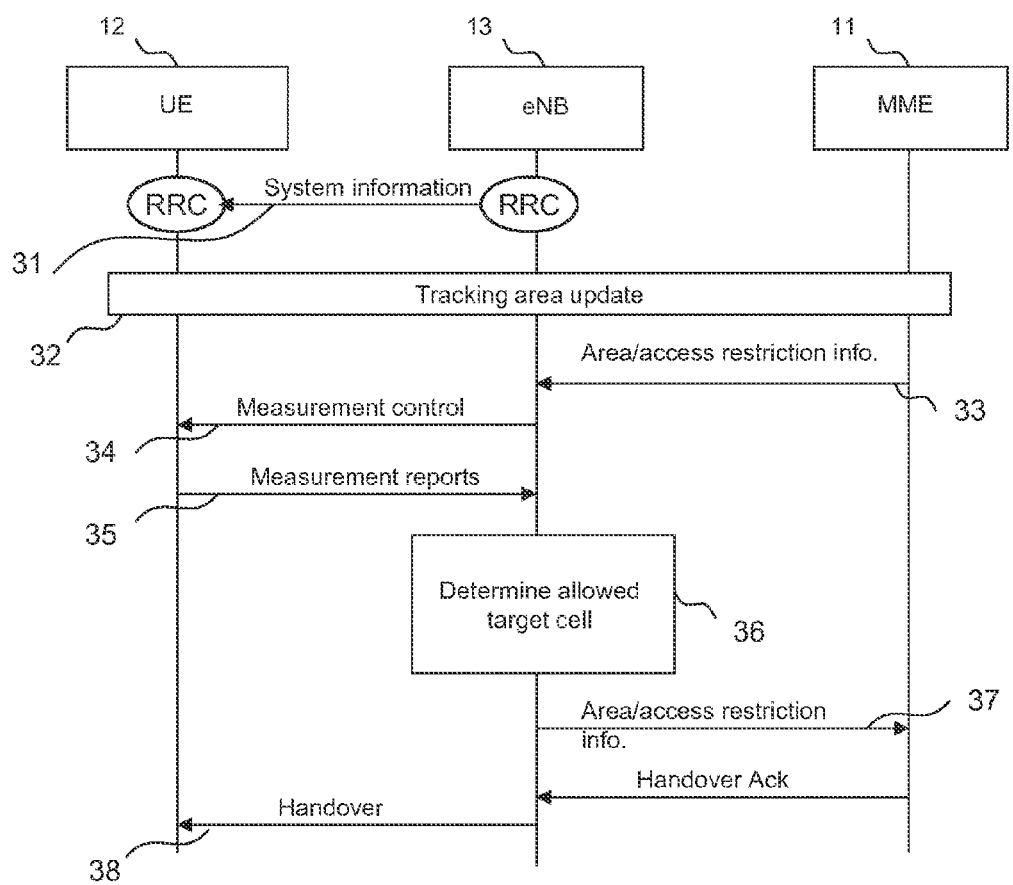
FIG. 3 is a schematic signaling diagram according to the prior art.

FIG. 3 illustrates a schematic signalling diagram according to the prior art. When the UE switches on, it receives system information 31 from the source eNB 13. The system information is included in radio resource control (RRC) messages and sent by the RRC sub-layer. The system information 31 is stored in the UE 12 and includes one or more PLMN identities, tacking area code, cell identity etc. In Idle state the UE 12 searches regularly for a better cell according to the cell reselection criteria, which involves measurements of the serving and neighboring cells. The UE 12 listens to the broadcast information on a cell's broadcast channel and stores the current tracking area identity. If the received tracking area identity differs from the one stored by the UE 12, a tracking area update procedure 32 is triggered by the UE 12. When the UE 12 transfers from idle to active state, area and access restriction information 33 is sent from MME/S-GW 11 to the serving or source eNB 13. This state transition occurs, for example, in the tracking area update, in which the area and access restriction information is provided at tracking area accepts. At service requests or at attach the UE is also switched from idle to active state and the area and access restriction information is then provided as the MME transfers a context for the UE to the eNB. The area and access restriction information is stored in the UE context of the concerned UE in eNB 13 and may include serving PLMN (Public Land Mobile Network) and Equivalent PLMNs as allowed PLMNs, forbidden tracking areas and location areas, and forbidden inter-RATs (radio Access technology). This information is used to determine whether a neighboring cell is allowed for handover.

A problem with the area and access restriction information is that an operator might want to restrict access to some user equipments from using for example home base station by blocking a certain LTE carrier frequency used for the home base stations and there is no simple way to perform this.

Figure 4:
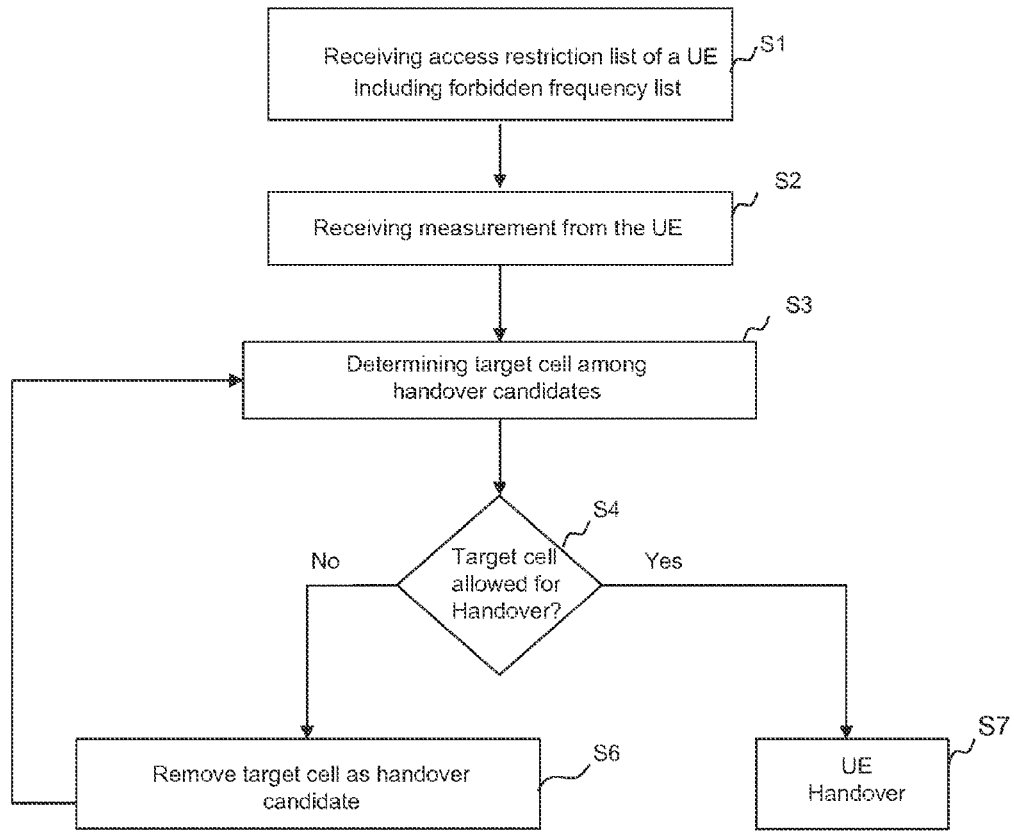
FIG. 4 is a flow diagram according to one embodiment of the invention.

FIG. 4 is a schematic flow diagram that illustrates an example, non-limiting procedures for restricting frequency access of a UE 12 in active state. At step S1 the eNB 13, i.e. source eNB 13, receives access restriction list of a UE 12 in active state from the MME/S-GW 11. The received list is stored in the UE context in the source eNB 13 and includes, serving PLMN and Equivalent PLMNs as allowed PLMNs, forbidden tracking areas and location areas, forbidden inter-RATs, and forbidden frequencies. At step S2 the source eNB 13 receives measurements from the UE 12 indicating as an example the identity of a target eNB 14, the used carrier frequency and UE 12 quantities measurements such as the received power measured, the received quality measured and the total received power measured, to be used by the source eNB 13 in the handover process. The cells reported in the measurement report are handover candidates. Based on the received measurement reports the target cell is determined at step S3 by the target eNB 14. Furthermore it is determined whether the identified target cell is allowed for handover S4 by checking the used carrier frequency in the target cell with the forbidden frequencies. If the used carrier frequency is not forbidden, i.e. the identified target cell is allowed for handover, a handover preparation is initiated towards the target eNB and after successful preparation a handover command is sent to the UE 12 to perform a handover to the target cell. If it is determined that the used frequency is one of the forbidden frequencies, i.e. the target is not allowed for handover, the target cell is removed as handover candidate and based on the measurements a new target cell is selected among the handover candidates.

Figure 5:
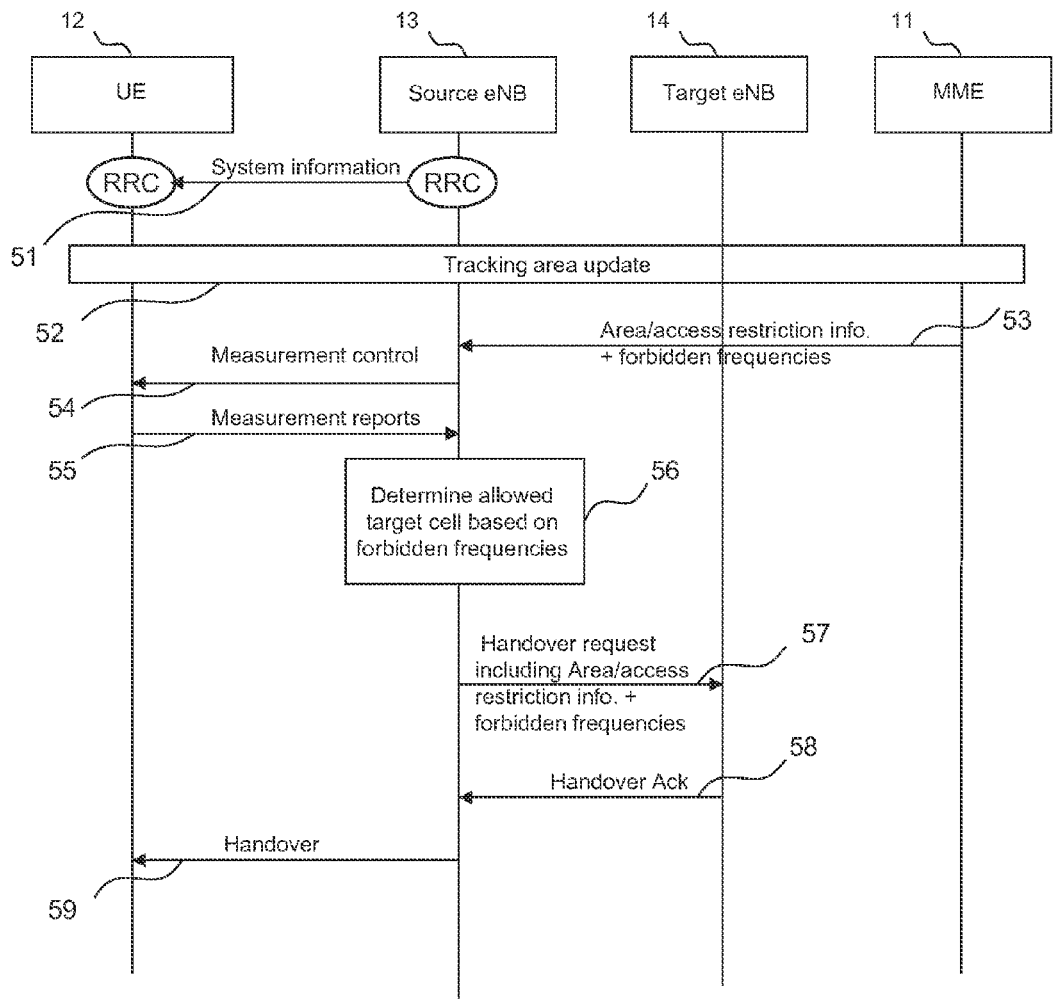
FIG. 5 is a signaling diagram according to one embodiment of the invention.

FIG. 5 illustrates a signaling diagram according to one embodiment of the invention. When the UE switches on, it receives system information 51 from the source eNB 13. The system information is included in a radio resource control (RRC) message and sent by the RRC sub-layer. The system information 51 is stored in the UE 12 and includes one or more PLMN identities, tacking area code, cell identity etc. In Idle state the UE 12 searches regularly for a better cell according to the cell reselection criteria, which involves measurements of the serving and neighbouring cells. The UE 12 listens to the broadcast information on a cell's broadcast channel and stores the current tracking area identity. If the received tracking area identity differs from the one stored by the UE 12, a tracking area update procedure 52 is triggered by the UE 12. When the UE 12 transfers from idle to active state, area and access restriction information 53 is sent from MME/S-GW 11 to the source eNB 13. The area and access restriction information is stored in the UE context in eNB 13 and includes for example serving PLMN and Equivalent PLMNs as allowed PLMNs, forbidden tracking areas and location areas, forbidden inter-RATs, and forbidden frequencies. The source eNB 13 configures the UE measurement procedures according to the received area restriction information 53 for the concerned UE and sends a measurement control message 54 to the UE 12. The UE 12 is triggered to send measurement reports 55 by the rules set by measurement control message 54 specification. Based on the received measurement reports 55 from the UE 12, the source eNB identifies a target cell. The source eNB 13 determines 56 whether the carrier frequency used by the identified target cell is forbidden according to the stored area and restriction information in the UE 12 context. If the identified carrier frequency is allowed, handover request with the stored area and access restriction area information is sent 57 to the target eNB 14 and, after target eNB has acknowledged 58 the handover, a handover command 59 is sent to the UE.

Figure 6:
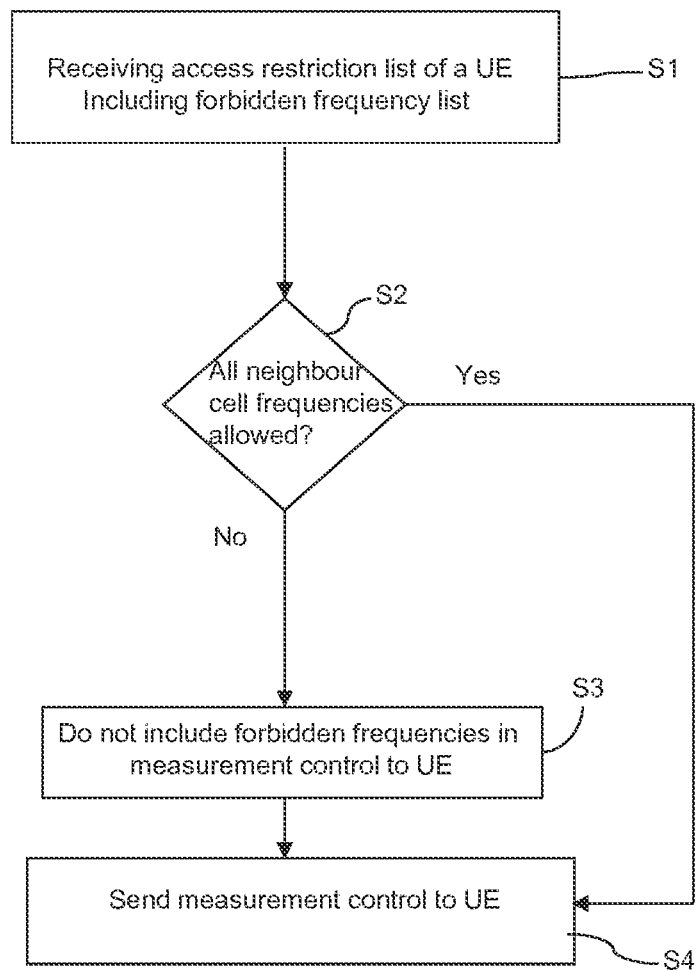
FIG. 6 is a flow diagram according to another embodiment of the invention.

FIG. 6 is a schematic flow diagram that illustrates another example, non-limiting procedures for restricting frequency access of a UE 12 in active state. At step S1 the eNB 13, i.e. source eNB 13, receives access restriction list of a UE 12 in active state from the MME/S-GW 11. The received list is stored in the UE context of the concerned UE in the source eNB 13 and includes, serving PLMN and Equivalent PLMNs as allowed PLMNs, forbidden tracking areas and location areas, forbidden inter-RATs, and forbidden frequencies. At step S2 the source eNB 13 checks whether the neighbouring cell list includes cells having forbidden frequencies. If all neighbouring cell frequencies are allowed the source eNB 13 sends measurement request to the UE 12 including all allowed neighbouring cells and/or all neighbouring frequencies S4. If one or more neighbouring cell frequencies are not allowed for a certain UE, the corresponding frequencies and/or cells are not included in the measurement control messages S3 to this UE. Hence, only the allowed neighbouring frequencies and/or cells are listed in the measurement control message sent from the source eNB 13 to the UE 12 S4. In this way the active UE only searches and measures cells of allowed frequencies.

Figure 7:
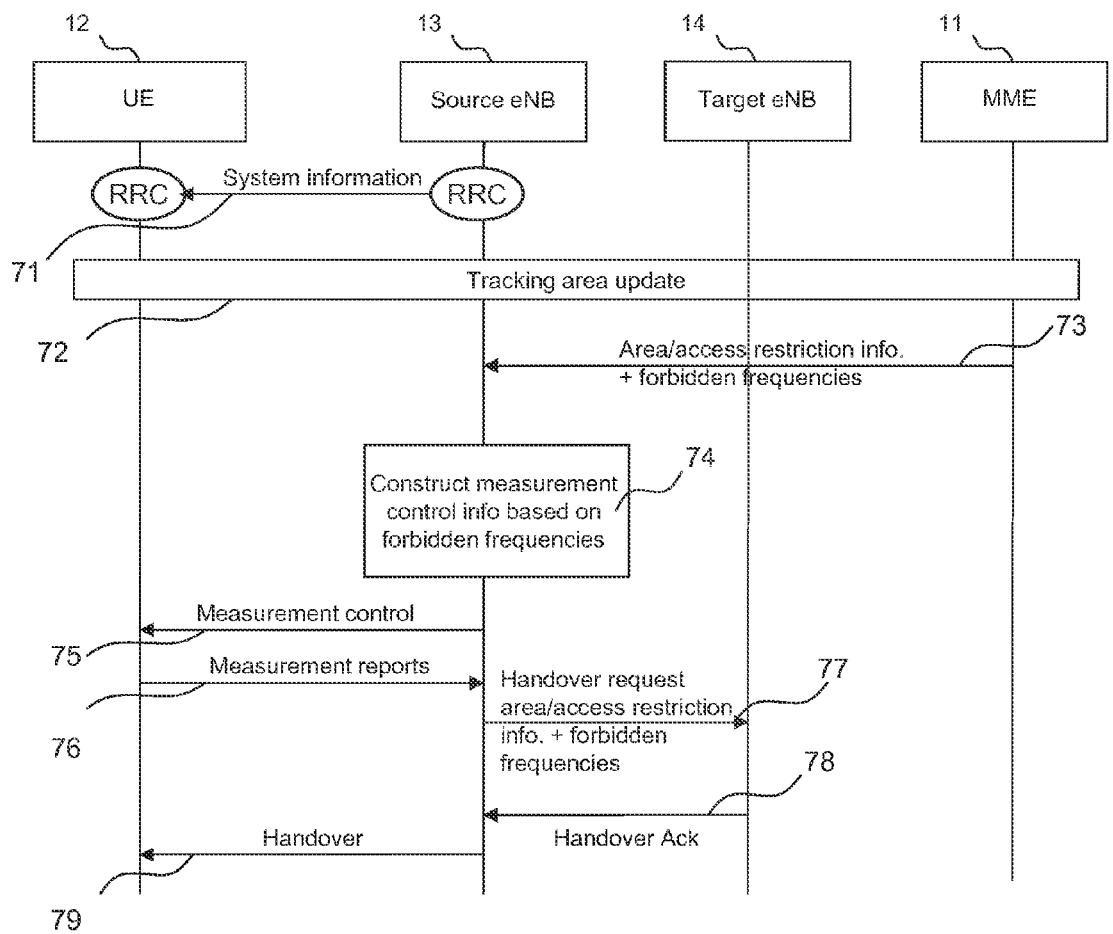
FIG. 7 is a signaling diagram according to another embodiment of the invention.

FIG. 7 illustrates a signaling diagram according to another embodiment of the invention. When the UE switches on, it receives system information 71 from the source eNB 13. The system information is included in a radio resource control (RRC) message and sent by the RRC sub-layer. The system information 71 is stored in the UE 12 and includes one or more PLMN identities, tacking area code, cell identity etc. In Idle state the UE 12 searches regularly for a better cell according to the cell reselection criteria, which involves measurements of the serving and neighbouring cells. The UE 12 listens to the broadcast information on a cell's broadcast channel and stores the current tracking area identity. If the received tracking area identity differs from the one stored by the UE 12, a tracking area update procedure 72 is triggered by the UE 12. When the UE 12 transfers from idle to active state, area and access restriction information 73 is sent from MME/S-GW 11 to the source eNB 13. The area and access restriction information is stored in the UE context in eNB 13 and includes for example serving PLMN and Equivalent PLMNs as allowed PLMNs, forbidden tracking areas and location areas, forbidden inter-RATs, and forbidden frequencies. The source eNB 13 constructs the UE measurement control information 74 based on the forbidden frequencies included in the received area restriction information 73 for the concerned UE and sends a measurement control message 75 to the UE 12. The UE 12 is triggered to send measurement reports 76 by the rules set by measurement control message 75 specification. Based on the received measurement reports 76 from the UE 12, the source eNB 13 identifies a target cell. The source eNB 13 sends a handover request with the stored area and access restriction area information 77 to the identified target eNB 14. When the target eNB 14 has acknowledged 78 the handover, a handover command 79 is sent to the UE 12.

Figure 8:
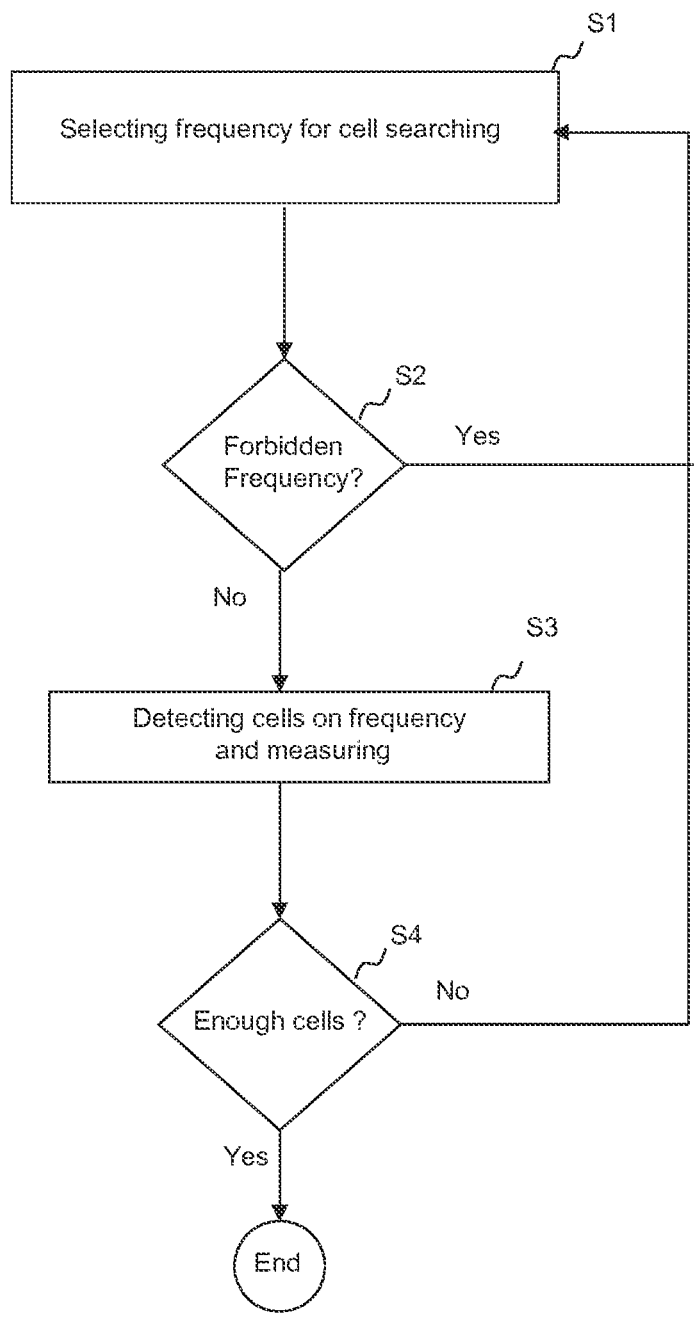
FIG. 8 is a flow diagram according to another embodiment of the invention

FIG. 8 is a schematic flow diagram that illustrates another example, non-limiting procedures for restricting frequency access of a UE 12 in idle state and performing cell reselection. When camped on a cell, the UE 12 searches regularly for a better cell according to the cell reselection criteria, which involve measurements of the serving and neighbouring cells. Each cell periodically broadcasts its identity and the identity of its tracking area. The UE 12 listens to the broadcast information on a cell's broadcast channel and stores the current tracking area identity. If the received tracking area identity differs from the one stored by the UE 12, a tracking area update procedure is triggered by the UE 12. At any tracking area update, a list of forbidden frequencies or a list of allowable frequencies is sent to the UE 12 and stored thereof. The UE 12 receives the list of forbidden/allowed frequencies and clears any previously stored forbidden/allowed frequency list. The list is sent from the MME/S-GW 11 to the UE 12 via the eNB 13. The list can be transparent for the eNB, or it can be S1-interface information that the eNB forwards to the UE. The UE uses the stored forbidden/allowed frequency list to determine allowed neighbour cells at idle state mobility, i.e. to determine suitable cells at cell reselection. Furthermore, the UE could use the stored forbidden/allowed frequency list to determine allowed neighbour cells at active state mobility, i.e. to determine allowed cells for handover. In active state the UE may need to take the intersection of the measurement control information and the stored information to determine what is allowed. In step S1 the UE selects carrier frequency for cell search. If the selected carrier frequency is forbidden according to the stored forbidden/allowed frequency list S2, the UE perform cell search on other frequencies. If the selected carrier frequency is allowed according to the stored forbidden/allowed frequency list S2, the UE 12 performs cell search and measures cell S3 specific information to be reported to the source eNB 13. If the UE considers that the number of searched cells is not enough (for example At least 6 cells according to the standard) S4 the UE select a (new or the same) carrier frequency for cell search and continues the process. If the number of found cells is considered to be enough S4, the UE stops cell searching. A UE in idle state performs cell reselection based on the measured cells, whereas a UE in active state reports the result to the source eNB 13.

As stated in the background, a cumbersome reconfiguration of the network could be necessary if the location areas between UTRAN frequencies or between GERAN frequencies or even between UTRAN and GERAN are configured with same location area identities. Reconfiguring location areas will have a negative effect of serviceability of a network in operation. This may be a problem even when an operator only wants to perform access restriction on an individual location area of one frequency, i.e. there is a location area 1 of frequency 1 and 2 but only frequency 2 in area 1 should be restricted for some subscribers. This would mean that an operator do not want to restrict frequency 2 everywhere in the network, but only when some subscribers are in area 1 of frequency 1. Hence, the operator would like to change the forbidden frequency list when moving in and out of area 1.

According to another embodiment of the invention, each forbidden frequency is attached to one or several areas if the network does not enable to change the forbidden frequency list at every area change (tracking area change or location area change). The area could be tracking area, location area, service area or maybe some new area concept that does not exist currently in 3GPP standard. The area indication would mean that the UE has the frequency as forbidden when current serving cell belongs to one of the areas attached to the frequency. Hence, when the eNB receives forbidden frequency 2 and area 1 attached to this frequency it would interpret the information as the UE, for which the forbidden frequencies are given, is forbidden to be handed over to frequency 2 when the UE is served by a cell belonging to area 1. If the same UE is served by a cell belonging to some other area, then frequency 2 is not forbidden for handover. When the UE receives forbidden frequency 2 and area 1 attached to this frequency it would interpret the information as it is forbidden to perform cell reselection to cells of frequency 2 while camping on a cell belonging to area 1. If the same UE is camping on a cell belonging to some other area then cell reselection to cells of frequency 2 is allowed.

Figure 9:
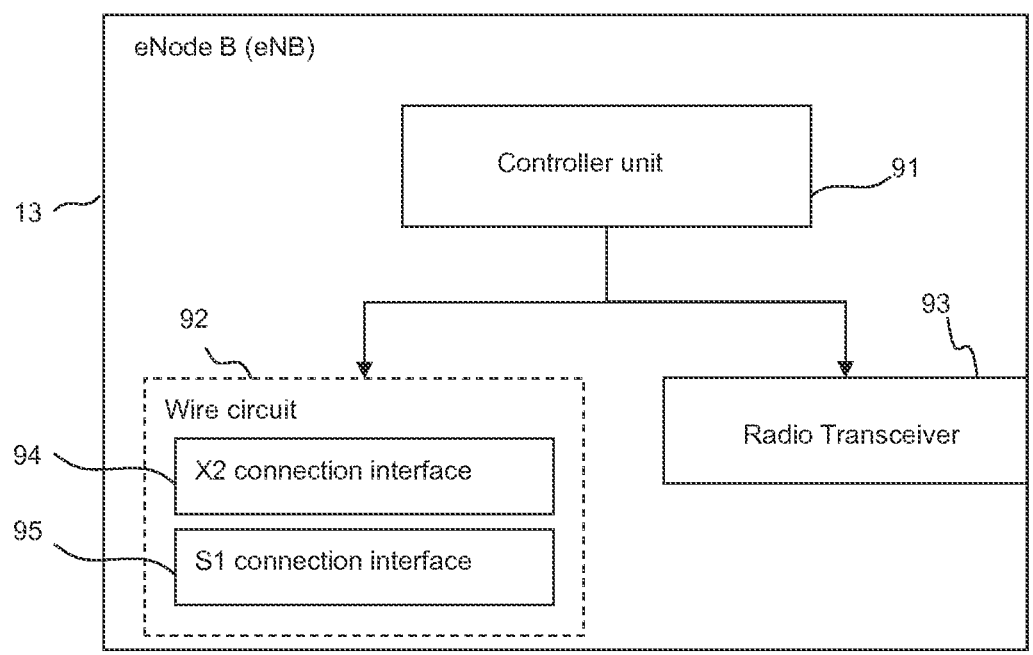
FIG. 9 is a function block diagram of a non-limiting example of base station for restricting frequency access according to the invention.

FIG. 9 is a function block diagram of a non-limiting example of an eNB 13 adapted to restrict frequency access in accordance, for example, with the procedures described above. The eNB includes a controller 91, a wired circuit 92 having a X2 connection interface 94 and an S1 connection interface 95, and a radio transceiver 93. The controller 81 handles the data processing of restricting frequency access. The X2 connection interface 94 is adapted to receive and transmit information on the X2 connection. The S1 connection interface 95 is adapted to receive and transmit information on the S1 connection. The radio transceiver 93 performs the baseband processing, filtering, frequency translation, amplification, and other operations necessary for radio communication.

The controller unit 91 receives and transmits area and access restriction information related messages such as system information, measurement requests and reports, address request and reports and also perform selecting allowed target cells for handover. The received measurement reports may include as an example the identities of the target eNB 14 and UE 12 quantities measurements such as the received power measured, the received quality measured, the carrier frequency of the target cell and the total received power measured, to be used by the controller unit in the handover process.

The present invention may be embodied in many different forms and should not be construed as limited to the embodiments set forth herein; rather, these embodiments are provided so that this disclosure will be thorough and complete, and will fully support the enclosed set of claims.

The invention claimed is:

1. A method executed in a user equipment for determining allowed neighbor cells for cell reselection, comprising:
   receiving a message addressed to the user equipment and including a list of allowed frequencies for the user equipment;
   storing the list of allowed frequencies in the user equipment;
   performing a cell search on neighbor cells and measuring cell-specific information on the searched neighbor cells using carrier frequencies that are allowed according to the stored list of allowed frequencies;
   identifying one or more allowed neighbor cells for cell reselection based on the measured cell-specific information; and
   performing cell reselection only to one of the allowed neighbor cells.

2. The method of claim 1, further comprising:
   selecting a carrier frequency for cell searching;
   determining if the selected carrier frequency is allowed according to the stored allowed frequency list; and
   as a consequence of determining that the selected carrier frequency is allowed according to the stored allowed frequency list, performing the cell search on at least one of the neighbor cells using the selected carrier frequency.

3. The method of claim 1, wherein the measured cell-specific information comprises a received power measurement or a received quality measurement.

4. A user equipment (UE) apparatus for determining allowed neighbor cells, comprising:
   a radio transceiver configured to receive a message addressed to the user equipment and including a list of allowed frequencies for the user equipment;
   a memory configured to store the list of allowable frequencies for the user equipment; and
   electronic circuitry configured to perform a cell search on neighbor cells and measure cell-specific information on the searched neighbor cells using carrier frequencies that are allowed according to the stored list of allowed frequencies, identify one or more allowed neighbor cells for cell reselection based on the measured cell-specific information, and perform cell reselection only to one of the allowed neighbor cells.

5. The UE apparatus of claim 4, wherein the electronic circuitry is further configured to select a carrier frequency for cell searching, determine if the selected carrier frequency is allowed according to the stored allowed frequency list, and as a consequence of determining that the selected carrier frequency is allowed according to the stored allowed frequency list, perform the cell search on at least one of the neighbor cells using the selected carrier frequency.

6. The UE apparatus of claim 4, wherein the measured cell-specific information comprises a received power measurement or a received quality measurement.

7. A method executed in a user equipment for determining allowed neighbor cells for cell reselection, comprising:
   receiving a message addressed to the user equipment and including a list of allowed frequencies for the user equipment, wherein the user equipment is restricted to the allowed frequencies when performing cell reselection to neighbor cells;
   storing the list of allowed frequencies in the user equipment;
   performing a cell search on neighbor cells and measuring cell-specific information on the searched neighbor cells using carrier frequencies that are allowed according to the stored list of allowed frequencies;
   identifying one or more allowed neighbor cells for cell reselection based on the measured cell-specific information; and
   performing cell reselection to one of the allowed neighbor cells.

8. The method of claim 7, further comprising:
   selecting a carrier frequency for cell searching;
   determining if the selected carrier frequency is allowed according to the stored allowed frequency list; and
   as a consequence of determining that the selected carrier frequency is allowed according to the stored allowed frequency list, performing the cell search on at least one of the neighbor cells using the selected carrier frequency.

9. The method of claim 7, wherein the measured cell-specific information comprises a received power measurement or a received quality measurement.

* * * * *

UNITED STATES PATENT AND TRADEMARK OFFICE
CERTIFICATE OF CORRECTION

PATENT NO. : 9,462,516 B2  
APPLICATION NO. : 14/944644  
DATED : October 4, 2016  
INVENTOR(S) : Dahlén Page 1 of 1

It is certified that error appears in the above-identified patent and that said Letters Patent is hereby corrected as shown below:

In Fig. 3, Sheet 3 of 9, for Tag "11", in Line 1, delete "MME" and insert -- MME/S-GW --, therefor.

In Fig. 5, Sheet 5 of 9, for Tag "11", in Line 1, delete "MME" and insert -- MME/S-GW --, therefor.

In Fig. 7, Sheet 7 of 9, for Tag "11", in Line 1, delete "MME" and insert -- MME/S-GW --, therefor.

In Column 1, Line 9, delete "2014," and insert -- 2014, now Pat. No. 9,432,892, --, therefor.

In Column 2, Line 38, delete "form" and insert -- from --, therefor.

In Column 2, Line 47, delete "eNB 12" and insert -- eNB 13 --, therefor.

In Column 5, Line 27, delete "controller unit (81)," and insert -- controller unit (91), --, therefor.

In Column 5, Line 38, delete "controller unit (81)," and insert -- controller unit (91), --, therefor.

In Column 6, Line 16, delete "invention" and insert -- invention; --, therefor.

In Column 10, Line 43, delete "controller 81" and insert -- controller 91 --, therefor.

Signed and Sealed this  
Thirteenth Day of June, 2017

Joseph Matal  
*Performing the Functions and Duties of the*  
*Under Secretary of Commerce for Intellectual Property and*  
*Director of the United States Patent and Trademark Office*